(12) United States Patent
Blum et al.

(10) Patent No.: US 6,562,894 B1
(45) Date of Patent: May 13, 2003

(54) AQUEOUS REACTIVE PUTTIES (II)

(75) Inventors: Harald Blum, Leverkusen (DE); Horst Clemens, Krefeld (DE); Michael Ehlers, Krefeld (DE); Christoph Irle, Dormagen (DE); Joachim Wolff, Odenthal (DE); Joachim Probst, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/868,127

(22) PCT Filed: Dec. 8, 1999

(86) PCT No.: PCT/EP99/09625

§ 371 (c)(1), (2), (4) Date: Jun. 14, 2001

(87) PCT Pub. No.: WO00/37519

PCT Pub. Date: Jun. 29, 2000

(30) Foreign Application Priority Data

| Dec. 21, 1998 | (DE) | 198 58 817 |
| Dec. 21, 1998 | (DE) | 198 58 818 |

(51) Int. Cl.$^7$ ............................................. C08L 75/00
(52) U.S. Cl. ................................... 524/507; 524/591
(58) Field of Search .............................. 524/507, 591

(56) References Cited

U.S. PATENT DOCUMENTS

| 4,147,680 | A | * | 4/1979 | Reischl | 260/29.2 |
| 4,310,448 | A | * | 1/1982 | Reischl | 260/29.6 |
| 4,978,708 | A | * | 12/1990 | Fowler | 524/507 |
| 5,334,651 | A | | 8/1994 | Schwab et al. | 524/591 |
| 5,344,873 | A | | 9/1994 | Blum | 524/591 |
| 5,354,807 | A | * | 10/1994 | Dochniak | 524/591 |
| 5,380,792 | A | | 1/1995 | Renk | 524/840 |
| 5,389,718 | A | | 2/1995 | Potter et al. | 524/591 |
| 5,594,065 | A | * | 1/1997 | Tien | 524/507 |
| 5,760,123 | A | * | 6/1998 | Birnbrich | 524/500 |
| 5,973,073 | A | * | 10/1999 | Guo | 525/123 |
| 6,166,150 | A | * | 12/2000 | Wilke | 525/453 |
| 6,197,874 | B1 | * | 3/2001 | Irle | 524/507 |
| 6,355,351 | B1 | * | 3/2002 | Sawada | 428/418 |
| 6,362,273 | B1 | * | 3/2002 | Martin | 524/591 |

FOREIGN PATENT DOCUMENTS

| DE | 19 750 451 | 5/1999 |
| EP | 0 154 924 | 7/1989 |
| EP | 0 798 299 | 10/1997 |

OTHER PUBLICATIONS

Database WPI, Section Ch, Week 199504, Derwent Publications Ltd., London, GB;, AN 1995–027766, XP002133817 & JP 06 313106 A (Mitsui Toatsu Chem Inc), Nov. 8, 1994.

* cited by examiner

Primary Examiner—Edward J. Cain
(74) Attorney, Agent, or Firm—Joseph C. Gil; Thomas W. Roy

(57) ABSTRACT

The invention relates to aqueous reactive 2-component binder combinations for aqueous reactive filler compositions, processes for the preparation of aqueous reactive filler compositions based on aqueous reactive 2-component binder combinations and the use of such filler compositions.

21 Claims, No Drawings

AQUEOUS REACTIVE PUTTIES (II)

BACKGROUND OF THE INVENTION

The invention relates to aqueous reactive 2-component binder combinations for aqueous reactive filler compositions, processes for the preparation of aqueous reactive filler compositions based on aqueous reactive 2-component binder combinations and the use of such filler compositions.

Unsaturated polyester resins as binders for filler compositions have been known for a long time. However, such products comprise relatively large amounts of reactive, volatile solvents, preferably styrene, as copolymerizable monomers. There has been no lack of attempts to develop binders based on unsaturated polyesters which have such a low viscosity that they can accommodate the large amounts of filler substances characteristic of filler compositions and, in spite of low molecular weights, can be hardened with the aid of peroxides in the absence of copolymerizable monomers to give non-tacky filler compositions. An example which may be mentioned here is EP 154 924, in which polyesters based on unsaturated dicarboxylic acids, diols and allyl ethers which can be formulated to filler compositions without reactive volatile solvents are claimed. Because the reactivity is too low or the curing is too slow for a number of applications, and because of the high raw materials cost, these and similar systems have so far not been able to find acceptance in the market. Aqueous one-component filler compositions are likewise known, but such products do not have the required level of properties for many areas of application.

There is therefore still the object of providing raw materials or binder combinations for filler compositions which can be formulated in a stable manner without the use of reactive, volatile solvents and using the high to very high amounts of filler substances characteristic of filler compositions, and can be cured in times relevant in practice to give high-quality filler compositions which can also be used in very thick layers up into the centimeter range. Other important requirements of new binder combinations for filler compositions are a rapid sandability, a specific filler consistency which is absolutely essential for proper processing, a high hardness with simultaneously adequate flexibility, a high filling power, a good adhesion to various substrates, a very good overpaintability with various paint systems, and good resistance properties.

Other important requirements of modern filler compositions are a low content of volatile organic substances (environment-friendliness), and the possibility of being able to formulate, on the basis of suitable binder combinations by choice of corresponding raw materials, additives, filler substances and pigments, filler compositions with a long processing time and nevertheless a good reactivity.

Surprisingly, it has now been found that aqueous reactive 2-component binder combinations for aqueous reactive filler compositions comprising at least one polyurethane or polyurethane-polyurea dispersion and at least one polyisocyanate containing free isocyanate groups are capable of meeting the abovementioned requirements. The binder combinations according to the invention and the filler compositions prepared therefrom comprise only small amounts of volatile constituents. By suitable choice of the raw materials, it is possible to prepare filler compositions which show practically no yellowing or chalking or discoloration, and it is also possible to formulate filler compositions which combine a long processing time and good reactivity.

SUMMARY OF THE INVENTION

The invention thus provides aqueous reactive 2-component binder combinations for aqueous reactive filler compositions comprising
  a) at least one polyurethane or polyurethane-polyurea dispersion and
  b) at least one polyisocyanate containing free isocyanate groups.

The invention also provides aqueous reactive 2-component binder combinations for aqueous reactive filler compositions comprising
  a) at least one polyurethane or polyurethane-polyurea dispersion comprising the reaction product of
    a1) at least one polyol component,
    a2) at least one di- and/or polyisocyanate component,
    a3) at least one (potentially) ionic compound with at least one group which is capable of salt formation and optionally at least partly present in the neutralized form and at least one group which is reactive towards isocyanate groups, and optionally a hydrophilic, nonionic compound, comprising compounds with at least one group which is reactive towards isocyanate groups and at least one hydrophilic polyether chain,
    a4) at least one mono-, di- and/or polyfunctional low molecular weight builder component of the molecular weight range 32 to 450 which differs from a1) to a3),
    component(s) a3) being employed in an amount such that a stable dispersion is formed, and
  b) at least one polyisocyanate which contains free isocyanate groups and has a viscosity of 10 to 20,000 mPas/23° C. and a functionality of 1.5 to 7.5.

DETAILED DESCRIPTION OF THE INVENTION

The invention preferably provides aqueous reactive 2-component binder combinations for aqueous reactive filler compositions comprising
  a) at least one polyurethane or polyurethane-polyurea dispersion comprising the reaction product of
    a1) 35 to 85 wt. % of at least one polyol component,
    a2) 5 to 50 wt. % of at least one di- and/or polyisocyanate component,
    a3) 1.5 to 10 wt. % of at least one (potentially) ionic compound with at least one group which is capable of salt formation and optionally at least partly present in the neutralized form and at least one group which is reactive towards isocyanate groups, and optionally a hydrophilic, nonionic compound, comprising compounds with at least one group which is reactive towards isocyanate groups and at least one hydrophilic polyether chain,
    a4) 1 to 10 wt. % of at least one mono-, di- and/or polyfunctional low molecular weight builder component of the molecular weight range 32 to 450 which differs from a1) to a3),
    component(s) a3) being employed in an amount such that a stable dispersion is formed, and
  b) at least one polyisocyanate which contains free isocyanate groups and has a viscosity of 10 to 10,000 mPas/23° C. and a functionality of 2.15 to 5.0,
the sum of the % figures of a1) to a4) being 100.

The invention particularly preferably provides aqueous reactive 2-component binder combinations for aqueous reactive filler compositions comprising a) at least one polyurethane-polyurea dispersion comprising the reaction product of
   a1) 40 to 75 wt. % of at least one di- and/or trifunctional polyester- and/or polyether-based polyol component of the molecular weight range 750 to 3,000 g/mol,
   a2) 15 to 45 wt. % of at least one diisocyanate component of the molecular weight range 168 to 262,
   a3) 1.5 to 8.5 wt. % of at least one (potentially) ionic compound with at least one group which is capable of salt formation and optionally at least partly present in the neutralized form and at least one group which is reactive towards isocyanate groups, and optionally a hydrophilic, nonionic compound, comprising compounds with at least one group which is reactive towards isocyanate groups and at least one hydrophilic polyether chain,
   a4) 1.5 to 8 wt. % of at least one mono-, di- and/or polyfunctional low molecular weight builder component of the molecular weight range 32 to 450 which differs from a1) to a3),
   component(s) a3) being employed in an amount such that a stable dispersion is formed, and
b) at least one polyisocyanate which contains free isocyanate groups and has a viscosity of 10 to 10,000 mPas/23° C. and a functionality of 2.15 to 5.0,
the sum of the % figures of a1) to a4) being 100.

The invention also provides aqueous reactive filler compositions comprising
   a) at least one polyurethane or polyurethane-polyurea dispersion,
   b) at least one polyisocyanate which contains free isocyanate groups and has a viscosity of 10 to 20,000 mPas/23° C. and a functionality of 1.5 to 7.5,
   c) at least one pigment and/or filler,
   d) optionally auxiliary substances and additives,
   e) optionally further oligomers or polymers present in the form of an aqueous solution, dispersion or emulsion and
   f) optionally water and/or an organic solvent,
the weight ratio of resin (solid from component a), from component b) and optionally from component e)) to pigment/filler (solid from component c)) being 1:1.3 to 1:20.

The invention preferably provides aqueous reactive filler compositions comprising
   a) 10 to 50 wt. % of at least one polyurethane or polyurethane-polyurea dispersion,
   b) 1 to 15 wt. % of at least one polyisocyanate which contains free isocyanate groups and has a viscosity of 10 to 20,000 mPas/23° C. and a functionality of 2.0 to 6.5,
   c) 40 to 90 wt. % of at least one pigment and/or filler,
   d) 0 to 3 wt. % of auxiliary substances, additional substances and/or additives,
   e) 0 to 50 wt. % of further oligomers or polymers optionally present in the form of an aqueous solution, dispersion or emulsion and
   f) 0 to 20 wt. % of water and/or organic solvents,
the sum of a) to f) being 100 wt. % and the weight ratio of resin (solid from component a), from component b) and optionally from component e)) to pigment/filler (solid from component c)) being 1:1.5 to 1:15.

The invention particularly preferably provides aqueous reactive filler compositions comprising
   a) 10 to 50 wt. % of at least one polyurethane or polyurethane-polyurea dispersion comprising the reaction product of
      a1) 35 to 85 wt. % of at least one polyol component,
      a2) 5 to 50 wt. % of at least one di- and/or polyisocyanate component,
      a3) 1.5 to 10 wt. % of at least one (potentially) ionic compound with at least one group which is capable of salt formation and optionally at least partly present in the neutralized form and at least one group which is reactive towards isocyanate groups, and optionally a hydrophilic, nonionic compound, comprising compounds with at least one group which is reactive towards isocyanate groups and at least one hydrophilic polyether chain,
      a4) 1 to 10 wt. % of at least one mono-, di- and/or polyfunctional low molecular weight builder component of the molecular weight range 32 to 450 which differs from a1) to a3),
      component(s) a3) being employed in an amount such that a stable dispersion is formed,
   b) 1 to 9.8 wt. % of at least one polyisocyanate which contains free isocyanate groups and has a viscosity of 10 to 20,000 mPas/23° C. and a functionality of 2.0 to 6.5,
   c) 40 to 90 wt. % of at least one pigment and/or filler,
   d) 0 to 3 wt. % of auxiliary substances, additional substances and/or additives,
   e) 0 to 50 wt. % of further oligomers or polymers optionally present in the form of an aqueous solution, dispersion or emulsion and
   f) 0 to 20 wt. % of water and/or organic solvents,
the sum of a) to f) being 100 wt. % and the weight ratio of resin (solid from component a), from component b) and optionally from component e)) to pigment/filler (solid from component c)) being 1:1.5 to 1:15.

The invention preferably provides aqueous reactive filler compositions comprising
   a) 10 to 50 wt. % of at least one polyurethane-polyurea dispersion comprising the reaction product of
      a1) 40 to 75 wt. % of at least one di- and/or trifunctional polyester- and/or polyether-based polyol component of the molecular weight range 750 to 3,000 g/mol,
      a2) 15 to 45 wt. % of at least one diisocyanate component of the molecular weight range 168 to 262,
      a3) 1.5 to 8.5 wt. % of at least one (potentially) ionic compound with at least one group which is capable of salt formation and optionally at least partly present in the neutralized form and at least one group which is reactive towards isocyanate groups, and optionally a hydrophilic, nonionic compound, comprising compounds with at least one group which is reactive towards isocyanate groups and at least one hydrophilic polyether chain,
      a4) 1.5 to 8 wt. % of at least one mono-, di- and/or polyfunctional low molecular weight builder component of the molecular weight range 32 to 450 which differs from a1) to a3),
      component(s) a3) being employed in an amount such that a stable dispersion is formed, and
   a) 1 to 9.8 wt. % of at least one polyisocyanate which contains free isocyanate groups and has a viscosity of 10 to 20,000 mPas/23° C. and a functionality of 2.0 to 6.5,
   b) 40 to 90 wt. % of at least one pigment and/or filler,
   c) 0 to 3 wt. % of auxiliary substances, additional substances and/or additives,
   d) 0 to 50 wt. % of further oligomers or polymers optionally present in the form of an aqueous solution, dispersion or emulsion and e) 0 to 20 wt. % of water and/or organic solvents, the sum of a) to f) being 100 wt. % and the weight ratio of resin (solid from component a), from component b) and optionally from component e)) to pigment/filler (solid from component c)) being 1:1.5 to 1:15.

The invention particularly preferably provides aqueous filler compositions comprising a) 22 to 38 wt. % of at least one polyurethane-polyurea dispersion, b) 1 to 7.5 wt. % of at least one polyisocyanate which contains free isocyanate groups and has a viscosity of 10 to 10,000 mPas/23° C. and a functionality of 2.15 to 5.0, c) 53 to 75 wt. % of at least one pigment and/or filler, d) 0 to 2 wt. % of auxiliary substances, additional substances and/or additives, e) 0 to 20 wt. % of further oligomers or polymers optionally present in the form of an aqueous solution, dispersion or emulsion and f) 0 to 10 wt. % of water and/or organic solvents, the sum of a) to f) being 100 wt. % and the weight ratio of resin (solid from component a), from component b) and optionally from component e)) to pigment/filler (solid from component c)) being 1:2.1 to 1:10.

The invention also provides a process for the preparation of aqueous reactive filler compositions, characterized in that a component which makes up at least 85 wt. % of the filler composition according to the invention is first prepared with the consistency required for processing appropriate in practice from at least one polyurethane or polyurethane-polyurea dispersion a) with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 20 wt. %, based on the total solids content, of an organic solvent and/or water f) in a suitable technical apparatus, and this is then mixed homogeneously, directly before processing, with the second component, which makes up not more than 15 wt. % of the filler composition according to the invention, that is to say at least one polyisocyanate crosslinking agent b), to give the filler composition according to the invention.

The invention also provides a process for the preparation of aqueous reactive filler compositions, characterized in that a component which makes up 90.2 to 99.7 wt. % of the filler composition according to the invention is first prepared with the consistency required for processing appropriate in practice from at least one polyurethane or polyurethane-polyurea dispersion a) with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 20 wt. %, based on the total solids content, of an organic solvent and/or water f) in a suitable technical apparatus, and this is then mixed homogeneously, directly before processing, with the second component, which makes up 9.8 to 0.3 wt. % of the filler composition according to the invention, that is to say at least one polyisocyanate crosslinking agent b), to give the filler composition according to the invention.

The invention also provides a process for the preparation of aqueous reactive filler compositions, characterized in that a component which makes up 96 to 99.5 wt. % of the filler composition according to the invention is first prepared with the consistency required for processing appropriate in practice from at least one polyurethane-polyurea dispersion a) containing isocyanate-reactive groups with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 20 wt. %, based on the total solids content, of an organic solvent and/or water f) in a suitable technical apparatus, and this is then mixed homogeneously, directly before processing, with the second component, which makes up 4 to 0.5 wt. % of the filler composition according to the invention, that is to say at least one polyisocyanate crosslinking agent b), to give the filler composition according to the invention.

The invention also provides a process for the preparation of aqueous reactive filler compositions, characterized in that the filler composition according to the invention is first prepared, directly before processing of the filler composition, from at least one polyurethane or polyurethane-polyurea dispersion a) with pigment or pigment mixtures, filler substances or filler substance mixtures c), optionally additives, auxiliary substances and additional substances d), optionally further oligomers or polymers e) optionally present in the form of an aqueous solution, dispersion or emulsion, optionally up to 10 wt. %, based on the total solids content, of an organic solvent and/or water f) and at least one polyisocyanate crosslinking agent b) in a suitable technical apparatus, and this is then optionally adjusted to the required processing consistency by addition of water and/or an organic solvent.

The invention also provides the use of the aqueous reactive 2-component binder combinations according to the invention in or as aqueous reactive filler compositions.

The invention also provides the use of the aqueous reactive 2-component binder combinations according to the invention in or as aqueous reactive filler compositions for wood, woody substrates and/or cork.

The invention also provides the use of the aqueous reactive 2-component binder combinations according to the invention in or as aqueous reactive filler compositions for metallic substrates, vehicle bodies and/or plastics.

The invention also provides the use of the aqueous reactive 2-component binder combinations according to the invention in or as aqueous reactive filler compositions for marble, granite and mineral substrates.

The polyurethane or polyurethane-polyurea dispersions can contain isocyanate-reactive groups, such as e.g. hydroxyl, amino, thio, epoxy, ketimine, aldimine, anhydride, oxazolidine, amide or lactam groups, aspartic acid ester groups containing secondary amine functions, and phenol and carboxyl or carboxylate groups.

The isocyanate-reactive groups they contain are preferably hydroxyl groups and/or carboxyl or carboxylate groups. Polyurethane or polyurethane-polyurea dispersions without hydroxyl groups can also be employed.

Polyol components a1) which are suitable for the preparation of the polyurethane or polyurethane-polyurea dispersions contained in the aqueous reactive binder combinations or filler composition according to the invention are e.g. polyester-polyol (e.g. Ullmanns Enzyklopädie der technischen Chemie [Ullmann's Encyclopaedia of Industrial Chemistry], 4th edition, volume 19, p. 62–65). Suitable raw materials for the preparation of these polyester-polyols are difunctional alcohols, such as ethylene glycol, 1,2- and 1,3-propylene glycol, 1,3-, 1,4- and 2,3-butanediol, 1,6-hexanediol, neopentylglycol, trimethylhexanediol, triethylene glycol, hydrogenated bisphenols, trimethylpentanediol, diethylene diglycol, dipropylene diglycol, 1,4-cyclohexanediol and 1,4-cyclohexanedimethanol, and difunctional carboxylic acids and anhydrides thereof, such as adipic acid, phthalic acid (anhydride), isophthalic acid, maleic acid (anhydride), terephthalic acid, tetrahydrophthalic acid (anhydride) hexahydrophthalic acid (anhydride), succinic acid (anhydride), fumaric acid, azelaic acid and dimer fatty acid. Polyester raw materials which are also suitable are monocarboxylic acids, such as benzoic acid, 2-ethylhexanoic acid, oleic acid, soya oil fatty acid, stearin fatty acid, groundnut oil fatty acid, linseed oil fatty acid, nonanoic acid, cyclohexanemonocarboxylic acid, isononanoic acid, sorbic acid and conjuene fatty acid, carboxylic acids or alcohols of higher functionality, such as trimellitic acid (anhydride), butanetetracarboxylic acid, trimer fatty acid, trimethylolpropane, glycerol, pentaerythritol, castor oil and dipentaerythritol, and other polyester raw materials not mentioned by name.

Polyester raw materials which are also suitable are mono-, di- and tricarboxylic acids or mono-, di- and triols containing sulfonate groups, such as e.g. the sodium or potassium salt of sulfoisophthalic acid. By using such units in the polyester-polyol preparation, it is possible to employ polyol components a1) containing sulfonate groups for the preparation of the polyurethane or polyurethane-polyurea dispersions a) and in this way to incorporate some or even all the amount of hydrophilicity required for the preparation of a stable dispersion into the polyurethane or polyurethane-polyurea dispersion via the polyester-polyol.

In this specific case, the amount of hydrophilic components a3) required for the hydrophilization is partly or completely co-incorporated in polyester-polyol a1) and as a result contained in the polyurethane or polyurethane-polyurea dispersion.

Polyol components a1) which are also suitable are polycarbonate diols, which can be obtained e.g. by reaction of diphenyl or dimethyl carbonate with low molecular weight di- or triols or epsilon-caprolactone-modified di- or triols.

Lactone-based polyester diols are also suitable, these being homo- or copolymers of lactones, preferably addition products, containing terminal hydroxyl groups, of lactones, such as e.g. epsilon-caprolactone or gamma-butyrolactone, on difunctional starter molecules. Suitable starter molecules can be the abovementioned diols, and also low molecular weight polyester or polyetherdiols. Instead of the polymers of lactones, it is also possible to employ the corresponding hydroxycarboxylic acids.

Polyether polyols are also suitable polyol components a1). They are obtainable, in particular, by polymerization of ethylene oxide, propylene oxide, tetrahydrofuran, styrene oxide and/or epichlorohydrin by themselves, e.g. in the presence of $BF_3$ or basic catalysts, or by addition of these compounds, optionally also as a mixture or in succession, on to starter components with reactive hydrogen atoms, such as alcohols, amines, amino alcohols or water.

The polyol components a1) mentioned can also be employed as mixtures, optionally also together with other polyols a1), such as e.g. polyester-amides, polyether-esters, polyacrylates and polyols based on epoxy resins.

The hydroxyl number of polyols a1) is 5 to 350, preferably 8 to 200 mg KOH/g substance. The molecular weights of polyols a) are between 300 and 25,000, preferably 750 and 3,000 g/mol.

Polyols a1) which are preferably employed are polyester-polyols, in particular polyester-polyols prepared on the basis of aromatic dicarboxylic acids and/or adipic acid and/or di- or trifunctional polyethers based on propylene oxide or propylene oxide/ethylene oxide, or mixtures of the polyols mentioned, optionally also with other polyols.

Component a2) comprises at least one organic di-, tri- or polyisocyanate of molecular weight 140 and 15,00, preferably 168 and 262. Suitable compounds are e.g. hexamethylene-diisocyanate (HDI, Desmodur® H, Bayer AG), isophorone-diisocyanate (IPDI, Desmodur® 1, Bayer AG), 4,4'-diisocyanatodicyclohexylmethane (H12MDI, Desmodur® W, Bayer AG), 1,4-butane-diisocyanate, hexahydrodiisocyanatotoluene, hexahydrodiisocyanatoxylene, nonane-triisocyanate, 2,4- or 2,6-diisocyanatotoluene (TDI), xylylene-diisocyanate and 4,4'--diisocyanatodiphenylmethane (MDI), and also other diisocyanates not mentioned by name. Polyisocyanates which are known per se, and are based on the isocyanates mentioned and also other isocyanates with uretdione, biuret, allophanate, isocyanurate, iminooxadiazinedione and/or urethane structural units can also be co-used.

The use of cycloaliphatic or aromatic difunctional isocyanates of molecular weight 168 to 222, optionally in combination with minor amounts of hexamethylene diisocyanate, in particular isophorone-diisocyanate, 4,4'-diisocyanatodicyclohexylmethane, 2,4- or 2,6-diisocyanatotoluene and 4,4'-diisocyanatodiphenylmethane, is particularly preferred.

Component a3) comprises at least one hydrophilic (potentially) ionic compound with at least one group which is capable of salt formation and optionally at least partly present in the neutralized form and at least one group which is reactive towards isocyanate groups, and optionally an additional nonionic compound with at least one group which is reactive towards isocyanate groups and at least one hydrophilic polyether chain, Ionic compounds a3) are e.g. carboxylic acids, sulfonic acids and/or phosphoric acids or salts thereof containing at least one, preferably one or two, hydroxyl and/or primary and/or secondary amino groups. Suitable acids are e.g. hydroxypivalic acid, dimethylolacetic acid, 2,2'-dimethylolpropionic acid, 2,2'-dimethylolbutyric acid, aminobenzoic acid, 2,2'-dimethylolpentanoic acid and addition products of acrylic acid and diamines, such as e.g. ethylenediamine or isophoronediamine. Sulfonate-diols optionally containing ether groups, such as are described e.g. in U.S. Pat. No. 4,108,814, are also suitable. Amino-functional sulfonates with one or two reactive, i.e. primary or secondary, amino groups are also suitable.

The free acid groups, in particular carboxyl and sulfonic acid groups, are the abovementioned "potentially ionic or anionic" groups, while the salt-like groups obtained by neutralization with bases or acids, in particular carboxylate groups and sulfonate groups, are the "ionic or anionic" groups referred to above.

(Potentially) anionic components a3) with two or three reactive primary and/or secondary amino groups can also be used as chain-lengthening component a).

In a specific embodiment, (potentially) anionic components a3) can also contain, in addition to sulfonate or carboxylate groups, free carboxyl groups, or also only free carboxyl groups and/or anhydride groups, and can be incorporated directly into polyol component a1) by a condensation reaction, e.g. via ester or amide bonds.

In this way, some or even all the amount of hydrophilic groups from a3) required for the preparation of stable dispersion can be incorporated directly into a1). Suitable compounds a3) for this, which are then incorporated into a1)

as a raw material component, are e.g. the sodium or potassium salt of sulfoisophthalic acid, trimellitic anhydride, tetrahydrophthalic anhydride and phthalic anhydride, the anhydrides mentioned last being converted in a known manner by reaction of some of the hydroxyl groups of polyol component a) with the anhydride to form half-esters which carry carboxyl groups, and the carboxyl groups being converted at least partly into carboxylate groups before dispersion of the polyurethane or polyurethane-polyurea.

Nonionically hydrophilic compounds a3) can optionally be co-used and contain one or two groups which are reactive towards isocyanate groups per molecule, in particular hydroxyl and/or primary or secondary amino groups, and at least one hydrophilic polyether chain. The polyether chains of these compounds consist to the extent of 30% to 100% of incorporated ethylene oxide units, in a preferred embodiment 40 to 95% of incorporated ethylene oxide units being present alongside 5 to 60% of incorporated propylene oxide units. Suitable such components a3) have molecular weights of 300 to 6,000 and are e.g. monofunctional polyethylene/propylene glycol monoalkyl ethers, such as Breox® 350, 550, 750 from BP Chemicals, Polyether LB 25, LB 30, LB 34, LB 40 from Bayer AG, polyethylene/propylene glycols, such as Carbowax® 300, 400, 1000, 2000, 6000 from Union Carbide, and di- or monofunctional polyether-amines, such as Jeffamine® ED600, ED900, ED4000, M715, M1000, M2070 from Texaco.

Nonionic monofunctional components a3) of molecular weight 1,000 to 2,500 with a content of incorporated propylene oxide of 10 to 57% and a content of incorporated ethylene oxide of 90 to 43% are preferably employed.

In principle, it is also possible to prepare polyurethane or polyurethane-polyurea dispersions with cationic hydrophilic groups, optionally together with nonionically hydrophilic compounds, and to employ them as binder combinations according to the invention in the filler compositions according to the invention. This is possible e.g. by employing compounds a3) which lead to hydrophilic quaternary amino groups after neutralization, e.g. with acid, in the preparation of the polyurethane or polyurethane-polyurea dispersions. Suitable compounds are e.g. N-methylethanolamine and N,N-dimethylethanolamine and suitable neutralizing agents are e.g. phosphoric acid, acetic acid and formic acid.

Component a4) is at least one low molecular weight builder component of the molecular weight range 62 to 450 which has one, two or more than two groups which are reactive towards isocyanate groups and differs from a1), a2) and a3). These reactive groups are preferably hydroxyl and/or primary amino and/or secondary amino groups.

Monofunctional or monoamino- and simultaneously hydroxy-functional components a4) can be employed as chain-stopping components a4) and optionally components a4) which are suitable for incorporation of terminal hydroxyl groups. In this way it is also possible to incorporate other functional groups into the polyurethane or the polyurethane-polyurea, such as e.g. alkoxysilane groups or unsaturated copolymerizable groups.

Corresponding suitable components a4) are e.g. diethanolamine, N-methylethanolamine, ethanolamine, isopropanolamine, diisopropanolamine and aminomethylpropanol. Compounds which are also suitable are e.g. 3-aminopropyltriethoxysilane, 3-aminopropyltrimethoxysilane, 3-aminopropylmethyldiethoxysilane, 4-amino-3,3-diethylbutylmethyldiethoxysilane, 2-ethylhexanol, stearyl alcohol, oleyl alcohol, cyclohexanol, hydroxyethyl acrylate, hydroxypropyl acrylate, hydroxypropyl methacrylate, hydroxyethyl methacrylate, butanediol monoacrylic acid ester, ethoxylated or propoxylated hydroxyethyl methacrylate or butanediol monoacrylate or hydroxypropyl methacrylate or hydroxypropyl acrylate or hydroxyethyl acrylate.

Monoamino- and simultaneously hydroxy-functional components a4) are employed here such that it is ensured either by the stoichiometry of the reaction components and/or the reaction procedure that only the amino group of such components a4) reacts with the isocyanate component, and the hydroxyl group(s) are available for the crosslinking reaction during use in the filler compositions according to the invention.

Components a4) which are difunctional and more than difunctional can be employed e.g. for building up hard segments or for introducing branching sites during or after the prepolymer preparation, or as components a4) having a chain-lengthening or chain-branching action, before, during or after the dispersing step.

Substances which are preferably employed for building up hard segments or for introducing branching sites during the prepolymer preparation are diols or triols, such as e.g. ethylene glycol, 1,2-, 1,3-propylene glycol, 1,4-butanediol, neopentylglycol, 1,6-hexanediol, trimethylpentanediol, glycerol, trimethylolpropane, ethoxylated or propoxylated trimethylolpropane or glycerol or butanediol or propylene glycol or ethylene glycol or butenediol or bisphenol A or mixtures of the starter molecules mentioned, and also of other hydroxy- and/or amino-functional starter molecules for ethoxylation or propoxylation reactions, the reaction product of 2 mol propylene carbonate and 1 mol hydrazine and/or mixtures of components a4) mentioned, optionally also with further components a4).

After preparation of the prepolymer, components a4) employed for chain lengthening or chain branching preferably contain at least two reactive primary or secondary amino groups. Suitable compounds are e.g. ethylenediamine, diethylenetriamine, isophoronediamine, 1,6-hexamethylenediaamine, 4,4-diaminodicyclohexylmethane, hydroxyethylethylenediamine, hydrazine (hydrate), the reaction product of hydrazine and acetone (acetone azine), propylenediamine, dimethylethylenediamine, adipic acid dihydrazide, diamine components containing sulfonate groups and/or mixtures of components a4) mentioned, optionally also with further components a4).

Di- and/or trifunctional (potentially) anionic components a3) with two or three reactive primary and/or secondary amino groups, such as e.g. 2-aminoethyl aminoethanesulfonate or the 1:1 reaction product of acrylic acid and isophoronediamine, can also be employed as chain-lengthening component a4). This can take place in combination with other abovementioned compounds a4), but one component a3) can also function as the sole chain-lengthening reagent a4).

By suitable choice of the various components a4) it is possible to adjust e.g. the hard segment content of the polyurethane or polyurethane-polyurea, the molecular weight build-up by chain lengthening or chain branching and the content of groups, in particular hydroxyl groups, available for later crosslinking reactions within wide limits.

The polyurethane and polyurethane-polyurea dispersions can be prepared e.g. in a manner such that an isocyanate-functional prepolymer is first prepared from at least one polyol a1), at least one isocyanate component a2), optionally co-using hydrophilic components a3) or a component a4) which forms a hard segment, some or the total amount of the remaining isocyanate groups are then reacted with a chain-stopping component a4), and a reaction is optionally carried out with a hydrophilic component a3) and/or a chain-lengthening component a4) before, during or after the dispersing, and after the dispersing the isocyanate groups optionally still remaining are subsequently reacted with at least one component a4) having a chain-stopping, chain-lengthening or chain-branching action, and the solvent optionally added before, during or after the preparation of the prepolymer is then optionally removed by distillation.

The reaction of the components can be carried out with the addition of catalysts, such as e.g. dibutyltin dilaurate, tin 2-octoate, dibutyltin oxide or diazabicyclononane.

For conversion of the acid groups into salt groups, it is possible to employ e.g. amines, such as triethylamine, N-methylmorpholine and diisopropylamine, hydroxyamines, such as diethanolamine, triethanolamine, diisopropanolamine and aminomethylpropanol, potassium hydroxide or sodium hydroxide, ammonia and di- or polyamines, such as hexamethylenediamine, diisopropylethylamine, isophoronediamine, dimethylethylenediamine, 1,4-cyclohexanediamine, trimethylhexanediamine, dimethylhexanediamine and Jeffamines (Texaco), such as e.g. 3,3'-[1,4-butanediylbis(oxy)]bis-1-propanamine, 4,4'-Methylene-bis-(2,6-diethylcyclohexanamine), 4,4'-methylene-bis-(2-methylcyclohexanamine), and 4,4'-methylene-bis-cyclohexanamine.

Preferred neutralizing agents are ammonia, N-methylmorpholine, triethylamine and diisopropylamine.

The degrees of neutralization are in general between 30 and 150%, preferably 50 to 90%.

In a preferred embodiment, the complete amount of neutralizing agent is already added before dispersion of the prepolymer or polymer in/with water.

After the dispersion in/by water, the dispersion is stirred until all the isocyanate groups optionally still present have reacted. Complete reaction of all the isocyanate groups with the above-mentioned components before the dispersing in/with water is also possible.

The solvents optionally employed for the preparation of the dispersion can be partly or completely removed from the dispersion by distillation. Preferred solvents are e.g. acetone, methyl ethyl ketone and N-methylpyrrolidone.

Auxiliary substances and additives, such as antisedimentation agents, defoamers, thickeners, emulsifiers, catalysts, flow auxiliaries, adhesion promoters, biocides, antistatics, light stabilizers, lubricants, heat stabilizers etc., and also specific oligomeric or polymeric compounds with or without hydrophilic groups can optionally be added to the polymer before, during or after the dispersing.

Preferred dispersions from the range of polyurethane and polyurethane-polyurea dispersion are polyurethane-polyurea dispersions, in particular polyurethane-polyurea dispersions based on polyester polyols and based on at least 75 wt. % cycloaliphatic or aromatic isocyanate units in component a2).

The polyurethane or polyurethane-polyurea dispersions can also be employed in a modified form in the binder combinations according to the invention for filler compositions and in the filler compositions according to the invention.

Polymer-modified polyurethane and polyurethane-polyurea dispersions are a preferred modified form. The modification can be carried out, for example, in a manner such that 20 to 90 wt. % polyurethane or polyurethane-polyurea dispersion is initially introduced into the reaction vessel and, using suitable initiators which generate free radicals and optionally additional emulsifiers, acrylic acid esters and/or methacrylic acid esters and/or vinylaromatics and/or vinyl esters and/or other copolymerizable substances are metered in at temperatures of 20 to 95° C. in amounts of 80 to 10 wt. % such that higher and preferably high molecular weight polyurethane-polymer dispersions or polyurethane-polyurea-polymer dispersion are formed. Such dispersions can have e.g. a core-shell morphology, graft products can form, or loop polymers are also formed.

Mixtures of various polyurethane or polyurethane-polyurea dispersion can also be employed, e.g. such that hydroxy-functional dispersions are combined with non-functional or carboxy-functional dispersions, or dispersions with a low glass transition temperature are combined with those with a high glass transition temperature, or dispersions with different molecular weights are combined. As a result, there is the possibility of specific requirements, such as e.g. high hardness and adequate elasticity, or very rapid sandability and high elasticity, being met to an even better degree.

The dispersions according to the invention have average particle diameters (determined e.g. by laser correlation spectroscopy) of 20 to 900, preferably 50 to 400 nm.

The dispersions according to the invention have molecular weights of preferably >50,000 g/mol, particularly preferably >100,000 g/mol. All the molecular weights stated are weight-average. The molecular weights can be determined e.g. by gel permeation chromatography.

The solids contents of the dispersions at viscosities of 10 to 150 seconds flow time (DIN 4 cup, 23° C.) are preferably at least 30%. The pH values are preferably between 6.0 and 10.5.

Suitable polyisocyanates b) are polyisocyanates with free isocyanate groups based on aliphatic, cycloaliphatic, aromatic-aliphatic and/or aromatic mono- di- and/or triisocyanates. The polyisocyanates in general have a viscosity at 23° C. of 10 to 20,000, preferably 10 to 10,000 mPas. If necessary, the polyisocyanates can be employed as a mixture with small amount of suitable solvents, in order to lower the viscosity to a value within the range mentioned.

Suitable monomeric isocyanates for the preparation of polyisocyanates b) are e.g. 1,6-hexamethylene-diisocyanate (Desmodur® H, Bayer AG), 1,4-butane-diisocyanate, isophorone-diisocyanate (Desmodur® 1, Bayer AG), bis-(4-isocyanatocyclohexyl)methane (Desmodur® W, Bayer AG), 1,4-bis-isocyanatocyclohexane, 2,4- and/or 2,6-toluylene-diisocyanate (TDI, Bayer AG) hexahydro-4- and/or 2,6-toluylene-diisocyanate, xylylene-diisocyanate, m- and p-tetramethylxylylene-diisocyanate, 1,3- and 1,4-bis-(2-isocyanatoethyl)cyclohexane, bis-(2-isocyanatophenyl)methane, bis-(4-isocyanatophenyl)-methane, nonane-triisocyanate, 1,5-diisocyanato-2,2-dimethylpentane, 2,2,4- or 2,4,4-trimethyl-1,6-diisocyanatohexane, 1,10-diisocyanatodecane, hexahydroxylylene-diisocyanate, tetramethylxylylene-diisocyanate, 4(3)-isocyanatomethyl-cyclohexyl isocyanate, phenyl isocyanate, stearyl isocyanate and other isocyanates, such as are described e.g. in "Methoden der organischen Chemie [Methods of Organic Chemistry]" (Houben-Weyl, vol. 14/2, 4th edition, Georg Thieme Verlag, Stuttgart 1963, p. 61–70. Mixtures of the isocyanates mentioned and also other isocyanates can also be employed. Preferred diisocyanates are hexamethylene-diisocyanate, isophorone-diisocyanate, bis-(4-isocyanatocyclohexyl)methane and/or 2,4- and/or 2,6-toluylene-diisocyanate, and the preferred triisocyanate is nonane-triisocyanate.

Suitable polyisocyanates are prepared by methods known from the literature from the diisocyanates and/or triisocyanates mentioned or also from other diisocyanates and/or triisocyanates, optionally co-using mono- and/or triisocyanates or co-using monoalcohols, diols and/or polyols, and have e.g. isocyanurate, biuret, allophanate, iminooxadiazinedione, carbodiimide, uretdione, urethane and/or urea structural units. Polyisocyanates with more than 65% aliphatic and/or cycloaliphatically bonded isocyanate end groups and isocyanurate, allophanate, iminooxadiazinedione and/or urethane structural units are preferably employed. Especially preferred polyisocyanates contain as isocyanate units, optionally in addition to other, as a rule hydroxy-functional units, hexamethylene-diisocyanate, mixtures of hexamethylene-diisocyanate and isophorone-diisocyanate or isophorone-diisocyanate as the starting material.

The diisocyanates used for the preparation of the polyisocyanates can in principle also be employed directly as polyisocyanate b), but this is not preferred.

Polyisocyanate components b) can be employed as hydrophobic polyisocyanates, that is to say as polyisocyanates containing no hydrophilic structural units which assist or allow the dispersion operation. In this case, preferably polyisocyanates with viscosities of <1,500, especially preferably with viscosities of <500 mPas/23° C. are employed. This ensures good mixing with the reaction partners, even under low shear forces. If the intrinsic viscosity of the hydrophobic polyisocyanates is not in the preferred viscosity range, this is preferably established by addition of suitable diluents.

Preferred hydrophobic polyisocyanate components b) are e.g. low-viscosity hexamethylene-diisocyanate trimers, such as e.g. Desmodur®) VP LS 2025/1 (Bayer AG), low-viscosity hexamethylene-diisocyanate polyisocyanates with uretdione and/or allophanate and/or trimer structural units, such as e.g. Desmodur® N 3400 (Bayer AG) and Desmodur® VP LS 2102 (Bayer AG), and in particular nonane-triisocyanate.

Polyisocyanate components b) can also be employed as hydrophilic polyisocyanates. Hydrophilization is possible e.g. by reaction of the polyisocyanates with deficits of hydrophilizing polyether alcohols, e.g. based on ethylene oxide or ethylene oxide/propylene oxide, which contain one or two isocyanate-reactive groups, preferably hydroxyl groups. The preparation of such hydrophilized polyisocyanates is described, for example, in EP-A 540 985.

Hydrophilization by means of the polyethers described above by reaction of deficits of these polyethers, using suitable catalysts, such as e.g. zinc(II) 2-ethyl-1-hexanoate, with polyisocyanates, in particular polyisocyanates with isocyanurate, biuret, urethane and/or iminooxadiazinedione structural units to form hydrophilizing allophanate structural units ("allophanate hydrophilization") is also possible. By this allophanate hydrophilization it is possible e.g. to hydrophilize two triply isocyanate-functional isocyanurate structural units by means of one polyether molecule. Such products are distinguished e.g. in that because of the specific preparation process and the specific structure of the hydrophilic groups, a particularly effective hydrophilization and furthermore an increased functionality is present.

It has been found that corresponding polyisocyanate components b) allow the preparation of filler compositions according to the invention with a particularly high level of properties, in particular in respect of hardness, sandability, resistance properties and adhesion. Those polyisocyanates b) modified by allophanate hydrophilization are therefore especially preferably employed.

Hydrophilization by addition of external emulsifiers of an ionic and/or nonionic nature to the polyisocyanates is also possible.

The use of polyisocyanates ionically hydrophilized internally, which can be obtained e.g. by reaction of polyisocyanates with optionally neutralized acids containing hydroxyl or amino groups, is also possible.

The use of polyisocyanates which have undergone both a hydrophilic and a hydrophobic modification, e.g. by reaction with long-chain monoalcohols, is also possible.

The use of polyisocyanates or polyisocyanate mixtures which have been hydrophilized by various of the modifications mentioned and also other modifications is also possible.

If necessary, the incorporation of hydrophilic polyisocyanates for the preparation of the filler compositions according to the invention can also be optimized by lowering the viscosity by means of addition of organic diluents.

Depending on the profile of requirements, both polyisocyanates hydrophilized to a low degree, that is to say with less than 5 wt. % hydrophilic groups, and normally hydrophilized, that is to say with 5 to 20 wt. % hydrophilic groups, and highly hydrophilized polyisocyanates, that is to say with more than 20 wt. % hydrophilic groups, can be employed.

Mixtures of various polyisocyanates, e.g. mixtures of a hydrophobic and a hydrophilic polyisocyanate, or mixtures of polyisocyanates based on various diisocyanates, such as e.g. a mixture of a cycloaliphatic polyisocyanate and an aliphatic polyisocyanate, can also be employed.

In a preferred embodiment, polyisocyanates hydrophilized with polyether to a low degree or normally and based on hexamethylene-diisocyanate or isophorone-diisocyanate, optionally in a mixture with low-viscosity, hydrophobic polyisocyanates based on hexamethylene-diisocyanate, or in a mixture with nonane-triisocyanate, are employed.

The use of polyisocyanates hydrophilized via allophanate formation and based on hexamethylene-diisocyanate, optionally in a mixture with low-viscosity hexamethylene-diisocyanate trimers, such as e.g. Desmodur® VP LS 2025/1 (Bayer AG) or/and low-viscosity hexamethylene-diisocyanate polyisocyanates with uretdione and/or allophanate structural units, such as e.g. Desmodur® N 3400 (Bayer AG) or Desmodur® VP LS 2102 (Bayer AG) is especially preferred.

At least 0.5 equivalent of polyisocyanate b) is employed per equivalent of isocyanate-reactive groups in polyurethane or polyurethane-polyurea a) and in optionally co-used component c). Preferably, 0.8 to 2.0, particularly preferably 1 to 1.4 equivalent of polyisocyanate b) are employed per equivalent of hydroxyl groups in a). In the case where polyurethanes or polyurethane-polyureas without hydroxyl groups are used or co-used, polyisocyanate b) is used at least in an amount as if the polyurethane or polyurethane-polyurea without hydroxyl groups were to contain 1 wt. %, preferably 2 or more wt. % hydroxyl groups.

The functionalities of polyisocyanates b) can in principle be chosen as desired, and e.g. functionalities of 1.5 to 7.5, preferably 2.0 to 6.5, and particularly preferably 2.15 to 5 are suitable.

Suitable components c)—pigments, fillers, extenders, or colouring or other additives—can be e.g.: talc, zinc oxides, zinc phosphates, barite, kaolin, silicon oxides, silicates, iron oxides, chromium oxides, titanium dioxides, other inorganic or also organic coloured pigments, micronized talc, chalk, calcium carbonate, dolomite, calcite, aluminium hydroxide, barium sulfate, aluminium silicates, magnesium silicates, feldspar, micaceous iron ore, glass fibres and glass beads.

Components c) which the compositions can preferably comprise are: a talc for good sandability, a talc for a high degree of filling, admixed extenders, such as calcium carbonate or barium sulfate, an anticorrosion pigment, such as e.g. zinc phosphate/zinc oxide for metallic substrates, and a colouring inorganic pigment, such as e.g. titanium dioxide.

The aqueous reactive filler compositions according to the invention can be optimized in respect of adhesion and sandability within wide limits by proper choice of the types and amounts of talc employed. Dolomite, calcite or barite give the filler a compact structure, which is very important e.g. for fine fillers. Barite flours (as far as possible with a low iron content) improve the deformability of the fillers. Colouring pigments which are preferably employed are inorganic pigments, such as e.g. Bayertitan rutile types, chromium oxide and/or Bayferrox® iron oxide types, in small amounts, preferably less than 10 wt. %, based on the total amount of components c).

In terms of amount, component(s) c) are the main component of the filler according to the invention.

Based on the solids contents, the weight ratio of c) to all other components is 1.3 to 20:1, preferably 1.5 to 15:1, and especially preferably 2.1 to 10:1.

Suitable components d)—auxiliary substances, additional substances and additives—can be e.g.: defoamers, flow auxiliaries, antisettling agents, catalysts, deaerating auxiliaries, stabilizers to prevent/reduce degradation by UV radiation or oxidative degradation, thickeners, rheology auxiliaries, thixotropic auxiliaries, wetting auxiliaries, dispersing auxiliaries, preservatives, emulsifiers, protective colloids, antifoams, corrosion inhibitors, antiflotation agents and antiskinning agents.

Components d) which are preferably employed are e.g. antisedimentation agents, thickeners, wetting auxiliaries, defoamers and thixotropic auxiliaries.

Components e) which are optionally to be co-used can be e.g. oligomeric and/or polymeric products 100% present in dissolved form or in the form of optionally aqueous dispersions or emulsions, such as e.g. polyurethanes, polurethane-polyureas, polyureas, polymers, acrylate copolymers, styrene-containing polymers, polyolefin resins, polybutadiene resins, polyesters, unsaturated polyesters, alkyd resins, polymers which are capable of oxidative crosslinking, allyl ether-containing products, cellulose and cellulose derivatives, melamine-aldehyde resins, urea resins, polyepoxides, products containing carbodiimide structures, polyamines, products containing thiol groups, reactive diluents with at least two isocyanate-reactive groups, such as e.g. liquid diols, triols, tetraols, amino alcohols, diamines or polyamines, in particular in the form of aspartic acid esters of reduced reactivity, e.g. obtainable by reaction of primary amines which are at least difunctional with maleic acid dialkyl esters, products with a plasticizing action, such as e.g. dibutyl phthalate or dioctyl phthalate, chlorinated rubber, polyvinyl chloride, polyvinyl alcohol, polyvinyl esters, polyvinylpyrrolidone, products containing alkoxysilane structures, fluorine-containing products, substances containing blocked isocyanate groups, phenolic resins, carboxyl-functional polymers and oligomers, epoxy-functional polymers and oligomers, polyamide resins, silicone resins, water-glass, polymers or oligomers based on silicic acid esters, silica sols and silica gels.

By addition of components e), specific properties of the filler compositions according to the invention can be established, if this is necessary for particular requirements.

Epoxy- or carbodiimide-functional components e) can be added e.g. to allow an additional crosslinking reaction between carboxyl groups of the polyurethane or polyurethane-polyurea and the epoxy groups after application of the filler composition and as a result to obtain e.g. a two-stage crosslinking and high crosslinking densities.

A suitable process for the preparation of aqueous reactive filler compositions is characterized in that a component which makes up at least 85 wt. % of the filler composition according to the invention is first prepared with the consistency required for processing appropriate in practice from at least one polyurethane or polyurethane-polyurea dispersion a) with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 20 wt. %, based on the total solids content, of an organic solvent and/or water f) in a suitable technical apparatus, and this is then mixed homogeneously, directly before processing, with the second component, which makes up not more than 15 wt. % of the filler composition according to the invention, that is to say at least one polyisocyanate crosslinking agent b), to give the aqueous reactive filler composition according to the invention.

Another suitable process for the preparation of aqueous reactive filler compositions is characterized in that a component which makes up 90.2 to 99.7 wt. % of the filler composition according to the invention is first prepared with the consistency required for processing appropriate in practice from at least one polyurethane or polyurethane-polyurea dispersion a) with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 20 wt. %, based on the total solids content, of an organic solvent and/or water f) in a suitable technical apparatus, and this is then mixed homogeneously, directly before processing, with the second component, which makes up 9.8 to 0.3 wt. % of the filler composition according to the invention, that is to say at least one polyisocyanate crosslinking agent b), to give the aqueous reactive filler composition according to the invention.

Another suitable process for the preparation of aqueous reactive filler compositions is characterized in that a component which makes up 96 to 99.5 wt. % of the filler composition according to the invention is first prepared with the consistency required for processing appropriate in practice from at least one polyurethane-polyurea dispersion a) containing isocyanate-reactive groups with pigment or pigment mixtures, filler substances or filler substance mixtures c), optionally additives, auxiliary substances and additional substances d), optionally further oligomers or polymers e) optionally present in the form of an aqueous solution, dispersion or emulsion, and optionally up to 10 wt. %, based on the total solids content, of an organic solvent and/or water f) in a suitable technical apparatus, and this is then mixed homogeneously, directly before processing, with the second component, which makes up 4 to 0.5 wt. % of the filler composition according to the invention, that is to say at least one polyisocyanate crosslinking agent b), to give the aqueous reactive filler composition according to the invention.

Another suitable process for the preparation of reactive filler compositions is characterized in that the filler composition according to the invention is first prepared, directly before processing of the aqueous reactive filler composition, from at least one polyurethane or polyurethane-polyurea dispersion a) with pigment or pigment mixtures, filler substances or filler substance mixtures c), optionally additives, auxiliary substances and additional substances d), optionally further oligomers or polymers e) optionally present in the form of an aqueous solution, dispersion or emulsion, optionally up to 10 wt. %, based on the total solids content, of an organic solvent and/or water f) and at least one polyisocyanate crosslinking agent b) in a suitable technical apparatus, and this is then optionally adjusted to the required processing consistency by addition of water and/or an organic solvent.

By suitable choice of the raw materials and by the additives, filler substances and pigments, the aqueous reactive 2-component binder combinations according to the invention offer the possibility of preparation of both very highly reactive aqueous filler compositions with a very rapid sandability, with then a relatively short processing time or short pot life, and aqueous filler compositions with a good reactivity or sandability and very long processing time. Filler compositions based on the polyurethane or polyurethane-polyurea dispersions according to the invention are furthermore distinguished in that filler compositions prepared therefrom as a rule have a flexibility which is excellent for filler compositions. By suitable choice of the raw materials, such as e.g. preferably aliphatic polyisocyanates and light-fast polyester polyols, it is also possible to prepare light-fast aqueous reactive filler compositions which show no discoloration, chalking or degradation phenomena under the conditions of the various applications of filler compositions.

With the filler compositions according to the invention it is thus possible to meet practically all conceivable profiles of requirements for filler compositions.

The filler compositions according to the invention comprise only small amounts of volatile organic substances. The content thereof is preferably less than 15, especially preferably less than 7.5 wt. %.

Components a), b), c), d) and e) can in principle be employed or added in any desired sequence during the preparation of the filler compositions according to the invention. The optimum process is to be determined in the individual case and depends e.g. on the particular profile of requirements of the filler and the reactivity of the individual raw materials.

Suitable technical apparatuses for the preparation of the aqueous reactive filler compositions according to the invention can be e.g.: kneaders, mixers, such as e.g. planetary mixers or butterfly mixers, and dissolvers.

The aqueous reactive filler compositions according to the invention can be applied, for example, as knifing fillers, brushable fillers, pourable fillers or sprayable fillers.

Curing of the aqueous reactive filler compositions according to the invention can take place at 0 to 80° C., preferably at room temperature. Curing at higher temperatures or, in particular, with the use of IR driers or also by microwave driers is also possible.

The aqueous reactive 2-component binder combinations according to the invention are outstandingly suitable in or as aqueous reactive filler compositions or repair filler compositions e.g. for wood, woody substrates and/or cork, for metallic substrates, vehicle bodies and/or plastics, and for marble, granite, concrete and mineral substrates.

Filler compositions are used e.g. to reduce the absorption capacity of absorbent substrates, for filling and smoothing edges and surfaces, and for filling up indentations, hollow spaces, pores, dents and scratches up to holes.

Car repair fillers thus allow e.g. flat and smooth surfaces to be re-established for subsequent painting, which usually comprises primer, filler and top coat(s).

Marble fillers thus allow, after filling up of indentations, hollow spaces and pores, cutting, sanding and polishing of the workpieces to smooth, high-quality marble components which can be used e.g. as floor, stair or window sill covering.

Wood fillers thus allow e.g. filling and smoothing of defects, knotholes etc. in wood or derived timber products, so that uniform, flat, high-quality painting can subsequently take place.

The aqueous reactive filler compositions according to the invention are distinguished by good drying and curing even in thick layers, long processing times of up to 30 minutes and more, by a very good adhesion, also on critical substrates, by good resistance properties, by a good sandability, by a good processability, in particular deformability and a filler consistency appropriate in practice, by a high filling capacity, by highly elastic properties and by the complete absence of shrinkage during curing.

Aqueous reactive filler compositions here are to be understood as filler compositions which comprise 2-component binder combinations and, in addition to at least one polyurethane or polyurethane-polyurea a), comprise at least one reactive crosslinking agent with free isocyanate groups b), and react to form a polyurethane or a polyurethane-polyurea network. The binder combinations according to the invention for filler compositions and the filler compositions prepared with them have a limited pot life or a limited processing time. By choosing suitable raw materials in the preparation of a) or b) and by choosing the nature and amount in particular of component c) and also d) and optionally e), it is possible to match the reactivity and the pot life or processing time to the particular requirements. In principle, very reactive systems, and above all systems with a long processing time and nevertheless still a good reactivity can be prepared.

The aqueous reactive 2-component binder combinations according to the invention and the aqueous reactive filler compositions prepared therefrom are also suitable for use in plugging compositions and as thick-layered fillers. The aqueous reactive 2-component binder combinations according to the invention are also suitable for use in or for the preparation of glass fibre-reinforced plastics or glass fibre-reinforced sheet-like structures or casting compositions.

EXAMPLES

Components b)

Polyisocyanate 1)

Allophanate-hydrophilized polyisocyanate 1) based on hexamethylene-diisocyanate: 850 g of a hexamethylene-diisocyanate trimer (Desmodur® N 3300, Bayer AG) are initially introduced, under dry nitrogen and together with 0.05 g dibutyl phosphate (stabilizer) and 0.4 g zinc(II) 2-ethyl-1-hexanoate (allophanating catalyst), into a stirred vessel with a stirring, cooling and heating device at 100° C. 150 g of a polyethylene glycol monomethyl ether (Pluriol® A 500E, OH number 112 mg KOH/g, BASF AG) are then metered in within 40 minutes such that the reaction temperature does not exceed 105° C. After the end of the addition of the polyether, the mixture is stirred at 100° C. for a further 2 to 3 hours until the isocyanate content of 15.9% corresponding theoretically to a complete allophanation is reached. The catalyst is then deactivated by addition of 0.1 g benzoyl chloride and the reaction mixture is cooled to room temperature. A water-dispersible, hydrophilized polyisocyanate 1) with a viscosity of approx. 6,000 mPas/23° C., an isocyanate functionality of 4 and an isocyanate content of 15.9% is obtained.

Polyisocyanate 2)

Hydrophobic, low-viscosity polyisocyanate 2): 4-Isocyanatomethyl-1,8-octane-diisocyanate (nonane-triisocyanate, Bayer AG), viscosity 12 mPas/23° C., isocyanate functionality 3, isocyanate content 50.1%

Polyisocyanate 3)

Hydrophobic polyisocyanate 3): Hexamethylenediisocyanate trimer with iminooxadiazinedione structural units. Viscosity 1,000 mPas/23° C., isocyanate content 23.3% (Desmodur® VP LS 2294, Bayer AG).

Components a)

Polyurethane-polyurea Dispersion 4)

447 g of a polyester diol based on adipic acid, phthalic anhydride, neopentylglycol, hexanediol (molecular weight 1,140 g/mol), 32 g neopentylglycol and 45 g dimethylolpropionic acid are weighed into a 10 l reaction vessel, under nitrogen, with a stirring, cooling and heating device, and after addition of 250 g N-methylpyrrolidone are dissolved, and homogenized at 70° C. After a homogenous solution has formed, a mixture of 182 g Desmodur® W (Bayer AG) and 229 g Desmodur 1 (Bayer AG) is added all at once. Due to the exothermic reaction, the temperature rises to about 100° C., and the mixture is stirred until the theoretical NCO value is reached. 17 g triethylamine and 21.6 g diisopropylethylamine are then added as a neutralizing agent at 50° C., and after 10 minutes the mixture is dispersed in 1,400 g distilled water, with intensive stirring. 5 minutes after the dispersing, a chain-lengthening solution of 13.3 g ethylenediamine, 15.1 g diethylenetriamine and 75 g water is added in the course of 15 minutes. The mixture is stirred at 50° C. until free isocyanate groups are no longer detectable. A polyurethane-polyurea dispersion 4) with a solids content of 36 wt. %, a viscosity of 20" (23° C., DIN 4 flow cup) and a pH of 7.4 is obtained.

Polyurethane-polyurea Dispersion 5)

1,694 g of a polyester diol based on adipic acid and hexanediol (molecular weight 840 g/mol), 70 g trimethylolpropane and 300 g of a diol containing sodium sulfonate groups (molecular weight 432 g/mol) are weighed into a 10 l reaction vessel, under nitrogen, with a stirring, cooling and heating device, melted at 90° C. and, after addition of 360 g N-methylpyrrolidone, homogenized. After a homogenous solution has formed, 1,280 g Desmodur W (Bayer AG) and 233 g Desmodur® H (Bayer AG) are added all at once. Due to the exothermic reaction, the temperature rises to about 120° C., and the mixture is stirred until the NCO value is slightly below the theoretical value. 220 g acetone azine are then added as a chain-lengthening agent at 75° C., and after 10 minutes 4,400 g distilled water, heated to 60° C., are added in the course of 5 minutes, with intensive stirring. The mixture is stirred at 50° C. until free isocyanate groups are no longer detectable. A polyurethane-polyurea dispersion 5) with a solids content of 40 wt. %, a viscosity of 15" (23° C., DIN 4 flow cup) and a pH of 6.8 is obtained.

Polyurethane-polyurea Dispersion 6)

447 g of a polyester diol based on adipic acid, phthalic anhydride, neopentylglycol, hexanediol (molecular weight 1,140 g/mol), 32 g neopentylglycol and 45 g dimethylolpropionic acid are weighed into a 10 l reaction vessel, under nitrogen, with a stirring, cooling and heating device, and after addition of 250 g N-methylpyrrolidone are dissolved, and homogenized at 70° C. After a homogenous solution has formed, 452 g Desmodur W are added all at once. Due to the exothermic reaction, the temperature rises to about 100° C., and the mixture is stirred until the theoretical NCO value is reached. 34 g triethylamine are then added as a neutralizing agent at 50° C., and after 10 minutes the mixture is dispersed in 1,400 g distilled water, with intensive stirring. 5 minutes after the dispersing, a chain-lengthening solution of 25 g hydroxyethylethylenediamine, 15.1 g diethylenetriamine and 75 g water is added in the course of 15 minutes. The mixture is stirred at 50° C. until free isocyanate groups are no longer detectable. A polyurethane-polyurea dispersion 6) with a solids content of 37 wt. %, a viscosity of 15" (23° C., DIN 4 flow cup) and a pH of 7.7 is obtained.

Polyurethane-polyurea Dispersion 7)

508 g of a polyester diol based on adipic acid and hexanediol (molecular weight 840 g/mol), 59 g neopentylglycol, 22 g of a monohydroxy-functional hydrophilic polyether (Polyether LB25, MW 2,250, Bayer AG) and 55.6 g dimethylolpropionic acid are weighed into a 10 l reaction vessel, under nitrogen, with a stirring, cooling and heating device, melted at 75° C. and, after addition of 450 g N-methylpyrrolidone, homogenized. After a homogenous solution has formed, 201 g diisocyanatodiphenylmethane and 416 g Desmodur W are rapidly added in succession at 75° C. Due to the exothermic reaction, the temperature rises to about 110° C., and the mixture is stirred at 100° C. until the theoretical NCO value is reached.

After cooling to 70° C., a neutralizing agent mixture of 20 g Polyether LB25, 45 g triethylamine and 110 g N-methylpyrrolidone is added and the mixture is homogenized for 10 minutes. The mixture is then dispersed in 1,600 g distilled water, heated at 30° C., in the course of 5 to 10 minutes with intensive stirring. 223 g water, 36 g hydroxyethylethylenediamine, 10 g diethylenetriamine and 8 g hydrazine hydrate are then added as a chain-lengthening agent in the course of 10 minutes and the mixture is stirred at 50° C. until free isocyanate groups are no longer detectable. A polyurethane-polyurea dispersion 7) with a solids content of 35 wt. %, a viscosity of 25" (23° C., DIN 4 flow cup) and a pH of 8.0 is obtained.

Use Example A)

A filler composition is prepared in a laboratory dissolver from 100 g polyurethane-polyurea dispersion 4), 10 g of a water/butyl glycol=1:1 mixture, 10 g Finntalk® M 40 (talc for good sandability, Finnminerals, Finland), 75 g Westmin D 100 (talc for high degree of filling, Westmin Minerals, Australia), 1.3 g Foamaster® TCX (defoamer, Henkel, Germany), 50 g Mikhart® 10 (calcium carbonate admixed extender, Provenciale, France), 10 g zinc phosphate ZP10 (anticorrosion pigment, Heubach, Germany) and additionally 30 g Finntalk® as an additional variable amount added to adjust the filler consistency. 100 g of this first component are mixed homogeneously with 3.4 g polyisocyanate 1) in a laboratory stirrer.

The aqueous reactive filler composition according to the invention thus prepared is drawn on to non-sanded vehicle body sheets at room temperature in a layer thickness of approx. 1 mm.

The following test results were determined:

Filler consistency[1]: good

Deformability[2]: good

Sandability[3]: after 30 minutes 5
   after 60 minutes 4c
   after 90 minutes 1c
   after 120 minutes 0a Adhesion[4]: very good (after 90 minutes)

Pendulum hardness[5]: after 4 hours of drying at room temperature: 13"
   after 24 hours of drying at room temperature: 24"
   after 2 hours of drying at 80° C.: 78"

Drying time[6]: 90 minutes

Pot life[7]: >8 hours

Processing time[8]: 30 minutes

The aqueous reactive filler composition according to the invention shows very good properties throughout. It combines excellent processability with good drying and sandability, a rapid adhesion is achieved, and the hardness meets the requirements. The processing time is decidedly long and therefore meets very high requirements. The high elasticity of the filler compositions is remarkable in particular, as is the fact that no shrinkage at all is to be observed. The filler composition is light-fast.

[1] The filler consistency is evaluated in accordance with the following qualitative grading:
Good>satisfactory>thick or thin>too thick or too thin.

[2] The deformability is evaluated in accordance with the following qualitative grading:
Readily deformable>still readily deformable>poorly deformable>not deformable.

[3] The sandability is evaluated as follows:
The sandability itself is evaluated from very good=0 to very poor=5, with the intermediate gradings good=1, still good=2, moderate=3, poor=4.
The time before the desired sandability is reached is also very important, the shorter the time required the better. The achievement of a good sandability within one hour during curing at room temperature is to be evaluated overall as very good here. Filler compositions which require longer than three hours to reach a good sandability are to be evaluated overall as less suitable.
The blocking of the sanding paper during sanding is furthermore also evaluated, and here a=does not block (best evaluation), b=blocks somewhat and c=blocks severely (poorest evaluation).

[4] The adhesion is evaluated with the aid of the time taken to achieve a good adhesion.
Adhesion within 2 hours: Very good
Adhesion within 6 hours: Good
Adhesion within 24 hours: still acceptable
Time taken to achieve a good adhesion more than 24 hours, or no adhesion at all:
Poor

[5] The pendulum hardness (DIN 53157) is determined on films (250 μm wet) of the binder combination of component a) and component b) after addition of 10 wt. % butyl glycol and defoamer, in order to obtain values which can be compared without the influence of component c). Pendulum hardnesses of >100" after 24 hours of drying at room temperature are to be described here as very good.

[6] The drying time is measured on the films corresponding to the pendulum hardness determination, but with a wet film thickness of 500 μm. The time until impresssions are no longer detectable in a finger test (finger drying) is stated. The faster the drying, the better the suitability for filler compositions.

[7] The pot life is defined as the period of time before the filler composition shows detectable changes, such as e.g. a clear increase in viscosity, formation of lumps, precipitates or crosslinking.
The processing time stated is the period of time within which the aqueous reactive filler composition can be processed reliably and leads to reproducible results. The actual processing time is often longer, but this time can be subject to variations, and first changes in the filler composition, such as e.g. skin formation, or changes in the application properties, such as e.g. a less good deformability, or changes in the end properties of the filler compositions applied, such as a somewhat longer time before a good adhesion is achieved, may already occur. In spite of these changes beginning, it is often still possible to obtain cured filler compositions with good end properties after application and curing.

Use Example B)

Use example A) with polyurethane-polyurea dispersion 4) is repeated, but a mixture of 1.8 g polyisocyanate 1) and 1.8 g polyisocyanate 3) is employed.

The aqueous reactive filler composition according to the invention thus prepared is drawn on to non-sanded vehicle body sheets at room temperature in a layer thickness of approx. 1 mm.

The following test results were determined:
Filler consistency: good
Deformability: good
Sandability: after 30 minutes 5
  after 60 minutes 3a
  after 90 minutes 1a
  after 120 minutes 0a
Adhesion: very good (after 90 minutes)
Pendulum hardness: after 4 hours of drying at room temperature: 26"
  after 24 hours of drying at room temperature: 62"
  after 2 hours of drying at 80° C.: 94"
Drying time: 100 minutes
Pot life: >8 hours
Processing time: 30 minutes This filler composition also shows good properties overall. It also has no shrinkage, and is light-fast and elastic.

Use Example C)

Use example A) is repeated, but polyurethane-polyurea dispersion 5) is employed, together with 3.8 g polyisocyanate 1).

The aqueous reactive filler composition according to the invention thus prepared is drawn on to non-sanded vehicle body sheets at room temperature in a layer thickness of approx. 1 mm.

The following test results were determined:
Filler consistency: good
Deformability: good
Sandability: after 30 minutes 5
  after 60 minutes 4c
  after 90 minutes 3c
  after 120 minutes 0a
Adhesion: very good (after 90 minutes)
Storage stability test: Evaluation of the filler consistency of the first component with storage at room temperature:
  after 10 days: OK
  after 30 days: OK
Pendulum hardness: after 4 hours of drying at room temperature: 22"
  after 24 hours of drying at room temperature: 39"
  after 2 hours of drying at 80° C.: 54"
Drying time: 90 minutes
Pot life: >8 hours
Processing time: 25 minutes This filler composition also shows good properties overall. It also has no shrinkage, and is light-fast and very elastic.

Use Example D)

Use example A) is repeated, but polyurethane-polyurea dispersion 6) is employed, together with 3.4 g polyisocyanate 1).

The aqueous reactive filler composition according to the invention thus prepared is drawn on to non-sanded vehicle body sheets at room temperature in a layer thickness of approx. 1 mm.

The following test results were determined:

Filler consistency: good

Deformability: good

Sandability: after 30 minutes 5
after 60 minutes 2–3c
after 90 minutes 1c
after 120 minutes 0a Adhesion: very good (after 105 minutes)

Pendulum hardness: after 4 hours of drying at room temperature: 19"
after 24 hours of drying at room temperature: 32"
after 2 hours of drying at 80° C.: 84"

Drying time: 90 minutes

Pot life: >8 hours

Processing time: 20 minutes

This filler composition also shows good properties overall. It also has no shrinkage, and is light-fast and very elastic.

Use Example E)

Use example A) is repeated, but polyurethane-polyurea dispersion 7) together with 2.5 g polyisocyanate 1) and 1 g polyisocyanate 3) is employed.

The aqueous reactive filler composition according to the invention thus prepared is drawn on to non-sanded vehicle body sheets at room temperature in a layer thickness of approx. 1 mm.

The following test results were determined:

Filler consistency: good

Deformability$^2$: good

Sandability: after 30 minutes 5
after 60 minutes 2c
after 90 minutes 0a–b

Adhesion: very good (after 90 minutes)

Pendulum hardness: after 4 hours of drying at room temperature: 15"
after 24 hours of drying at room temperature: 52"
after 2 hours of drying at 80° C.: 90"

Drying time: 90 minutes

Pot life: >8 hours

Processing time: 15 minutes

This filler composition also shows good properties overall. It also has no shrinkage, and is very elastic.

Comparison Example F)

Use example A) is repeated, but the use of the polyisocyanate crosslinking agent is omitted.

The following test results were determined:

Filler consistency: good

Deformability: good

Sandability: after 30 minutes 5
after 45 minutes 5
after 60 minutes 5
after 75 minutes 5
after 90 minutes 5
after 120 minutes 4d (test was interrupted)

Pendulum hardness: after 4 hours of drying at room temperature: 12"
after 24 hours of drying at room temperature: 47"
after 2 hours of drying at 80° C.: 93"

Drying time: 120 minutes

Pot life: 25 minutes

This filler composition shows a slower drying, a somewhat shorter pot life, but above all clear deficiencies in sandability, and is thus not appropriate in practice.

Use Example G)

Use example C) is repeated, but in addition to 100 g polyurethane-polyurea dispersion 5), 10 g of a water/butyl glycol=1:1 mixture, 100 g Finntalk® M 40, 150 g barite EWO (Sachtleben, Germany), 1.3 g Foamaster® TCX, 50 g Mikhart 10, 10 g titanium dioxide (Bayertitan® R-KB-2, Bayer, Germany), 1.5 g Aerosil 200 (Degussa, Germany) and 20 g zinc phosphate ZCP (anticorrosion pigment, Heubach, Germany) are used.

100 g of this first component are mixed homogeneously with 3.8 g polyisocyanate 1) in a laboratory stirrer.

The aqueous, highly reactive filler composition according to the invention thus prepared is drawn on to non-sanded vehicle body sheets at room temperature in a layer thickness of approx. 1 mm.

The following test results were determined:

Filler consistency: good

Deformability: good

Sandability: after 30 minutes 5
after 60 minutes 1b
after 75 minutes 0

Adhesion: very good (after 60 minutes)

Pendulum hardness: after 4 hours of drying at room temperature: 22"
after 24 hours of drying at room temperature: 37"
after 2 hours of drying at 80° C.: 48"

Drying time: 60 minutes

Pot life: >8 hours

Processing time: 5 minutes

This filler composition also shows good properties overall. It is very reactive, has no shrinkage, and is very elastic.

What is claimed is:

1. An aqueous, reactive, filler composition comprising
   a) 22 to 38 wt. % of at least one polyurethane-polyurea dispersion,
   b) 1 to 7.5 wt. % of at least one polyisocyanate which contains free isocyanate groups and has a viscosity of 10 to 10,000 mPas/23° C. and a functionality of 2.15 to 5.0,
   c) 53 to 75 wt. % of at least one pigment and/or filler,
   d) 0 to 2 wt. % of an auxiliary substance or additive,
   e) 0 to 20 wt. % of an oligomer or polymer other than a), optionally present in the form of an aqueous solution, dispersion or emulsion and
   f) 0 to 10 wt. % of water and/or an organic solvent,
   wherein the sum of a) to f) is 100 wt. % and the weight ratio of resin (solids from component a), component b) and component e)) to pigment/filler (solids from component c)) is 1:2.1 to 1:10.

2. A process for the preparation of the aqueous, reactive, filler composition of claim 1 which comprises preparing at least 85 wt. % of the filler composition with the consistency required for processing by mixing polyurethane or polyurethane-polyurea dispersion a) with pigment or filler c), optionally auxiliary substance or additive d), optionally other oligomer or polymer e) and optionally up to 20 wt. %, based on the total solids content, of an organic solvent and/or water f) and then homogeneously mixing directly before processing not more than 15 wt. %, based on the filler composition, of polyisocyanate b).

3. The process of claim 2 which comprises preparing 90.2 to 99.7 wt. % of the filler composition with the consistency required for processing by mixing polyurethane or polyurethane-polyurea dispersion a) with pigment or filler c), optionally auxiliary substance or additive d), optionally other oligomer or polymer e) and optionally up to 20 wt. %, based on the total solids content, of an organic solvent and/or water f) and then homogeneously mixing directly before processing 0.3 to 9.8 wt. %, based on the filler composition, of polyisocyanate b).

4. The process of claim 2 which comprises preparing 96 to 99.5 wt. % of the filler composition with the consistency required for processing by mixing polyurethane-polyurea dispersion a), which contains isocyanate-reactive groups, with pigment or filler c), optionally auxiliary substance or additive d), optionally other oligomer or polymer e) and optionally up to 10 wt. %, based on the total solids content, of an organic solvent and/or water f) and then homogeneously mixing directly before processing 0.5 to 4 wt. %, based on the filler composition, of polyisocyanate b).

5. A process for the preparation of aqueous, reactive, filler composition of claim 1 which comprises preparing the filler composition directly before processing from polyurethane or polyurethane-polyurea dispersion a), pigment or filler c), optionally auxiliary substance or additive d), optionally other oligomer or polymer e), optionally up to 10 wt. %, based on the total solids content, of an organic solvent and/or water f) and polyisocyanate b) and then optionally adjusting to the required processing consistency by the addition of water and/or an organic solvent.

6. The aqueous, reactive, two-component binder composition of claim 1 wherein polyisocyanate b) comprises an allophanate-hydrophilic polyisocyanate prepared by the reaction of a hydrophilic polyether with aliphatic and/or cycloaliphatic polyisocyanate employing suitable catalysts.

7. The aqueous, reactive, two-component binder composition of claim 1 wherein polyisocyanate b) comprises a hexamethylene-diisocyanate polyisocyanate with iminooxadiazinedione groups.

8. The aqueous, reactive, two-component binder composition of claim 1 wherein polyisocyanate b) comprises nonane triisocyanate.

9. The aqueous reactive filler composition of claim 1 wherein component c) comprises not more than 10 wt. %, based on the total amount of c), of an inorganic coloring pigment.

10. The aqueous, reactive, two-component binder composition of claim 1 wherein component a3) containing hydrophilic groups is incorporated partly or completely into polyol compound a1), via ester groups, into the polyurethane or polyurethane-polyurea dispersion a).

11. The aqueous, reactive, two-component binder composition of claim 1 wherein polyisocyanate b) comprises a low viscosity hydrophobic polyisocyanate based on hexamethylene diisocyanate and containing isocyanurate, uretdione, allophanate and/or urethane groups and/or a polyisocyanate based on hexamethylene diisocyanate and hydrophilically modified by reaction with a hydrophilic polyether.

12. The aqueous, reactive, two-component binder composition of claim 1 wherein component a) comprises a copolymer- or polyacrylate-modified polyurethane or polyurethane-polyurea dispersion.

13. The aqueous, reactive, two-component binder composition of claim 1 wherein the polyurethane or polyurethane-polyurea dispersion of component a) has a molecular weight, Mw, of >50,000.

14. The aqueous, reactive, two-component binder composition of claim 1 wherein component e) comprises an epoxy-functional oligomer or polymer.

15. The aqueous, reactive, two-component binder composition of claim 1 wherein components a) and b) are selected from light-fast compounds.

16. The aqueous, reactive, filler composition of 1 which contains less than 5 wt. % of volatile organic substances.

17. A substrate coated with the aqueous, reactive, two-component binder composition of claim 1.

18. Wood, a woody substrate or cork coated with the aqueous, reactive, filler composition of claim 1.

19. A metallic substrate, vehicle body plastic coated with the aqueous, reactive, two-component binder composition of claim 1.

20. A marble, granite or mineral substrate coated with the aqueous, reactive, two-component binder composition of claim 1.

21. A glass fiber-reinforced plastic, glass fiber-reinforced sheet-like structure or casting resin coated with the aqueous, reactive, two-component binder composition of claim 1.

* * * * *